United States Patent [19]

Inoue

[11] 4,386,248
[45] May 31, 1983

[54] ELECTRICAL MACHINING METHOD AND APPARATUS FOR FORMING A 3D SURFACE CONTOUR IN A WORKPIECE WITH A TRAVELING-WIRE ELECTRODE

[75] Inventor: Kiyoshi Inoue, Tokyo, Japan

[73] Assignee: Inoue-Japax Research Incorporated, Yokohama, Japan

[21] Appl. No.: 185,887

[22] Filed: Sep. 10, 1980

Related U.S. Application Data

[63] Continuation-in-part of Ser. No. 81,352, Oct. 3, 1979, Pat. No. 4,301,349.

[30] Foreign Application Priority Data

Oct. 6, 1978 [JP] Japan ................................ 53-123280
Dec. 14, 1978 [JP] Japan ................................ 53-155569
Jun. 13, 1979 [JP] Japan ................................ 54-75084
Sep. 14, 1979 [JP] Japan ................................ 54-117404
Nov. 28, 1979 [JP] Japan ................................ 54-153044

[51] Int. Cl.³ ............................................. B23P 1/12
[52] U.S. Cl. ............................... 219/69 W; 219/69 M
[58] Field of Search ............... 219/69 M, 69 W, 69 V; 242/157 R, 155 R

[56] References Cited

U.S. PATENT DOCUMENTS 2,974,216  3/1961  Inoue .................................. 219/69 M
3,366,771  1/1968  Jackson et al. ................... 219/69 W
4,242,556  12/1980  Ullmann et al. ................. 219/69 W
4,307,279  12/1981  Inoue et al. ....................... 219/69 W

FOREIGN PATENT DOCUMENTS 2816588  10/1978  Fed. Rep. of Germany ... 219/69 W
193294  3/1967  U.S.S.R. ........................... 219/69 W Primary Examiner—M. H. Paschall
Attorney, Agent, or Firm—Karl F. Ross; Herbert Dubno

[57] ABSTRACT

A method of and apparatus for electroerosively forming a 3D contour in a workpiece with a continuous elongate electrode axially transported continuously from a supply unit to a takeup unit to continuously renew a machining surface of the electrode juxtaposed in an electroerosion machining relationship with the workpiece is disclosed in which the continuous elongate electrode traveling between the supply and takeup unit is supported with guide unit carried by a tool head and having an arcuate guide surface juxtaposed with the workpiece to guide the traveling elongate electrode over at least a portion of the arcuate guide surface thereby constituting the machining surface at least in part with at least a portion of the elongate electrode traveling and guided over the guide surface. The tool head is translationally displaced relative to the workpiece so that the aforementioned portion of the elongate electrode moves along a predetermined continuous path in the workpiece while the guide unit carried on the tool head is rotated relative to the workpiece about a rotary axis intersecting the machining surface in a plane defined by the elongate electrode traveling and guided over the guide surface, thereby forming the contour in the workpiece.

16 Claims, 9 Drawing Figures

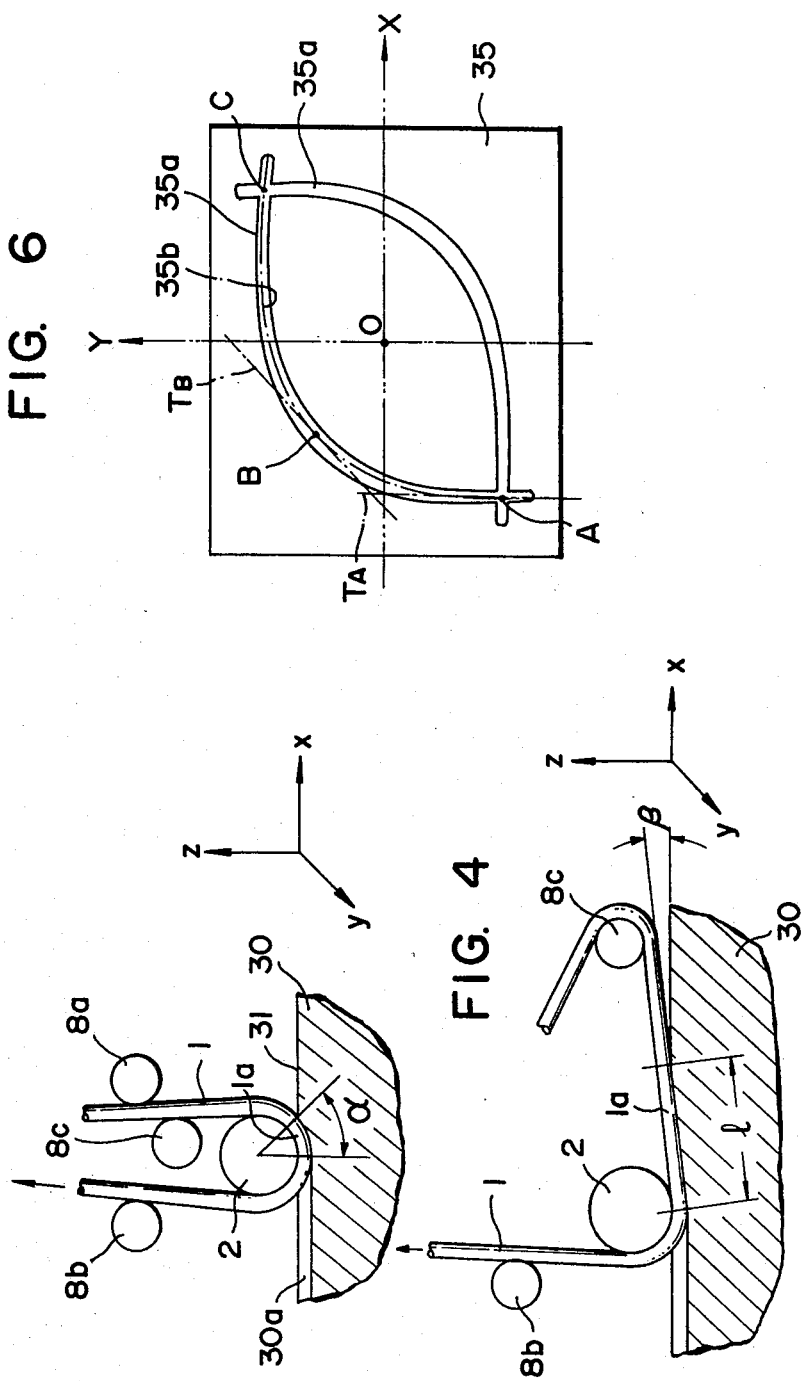

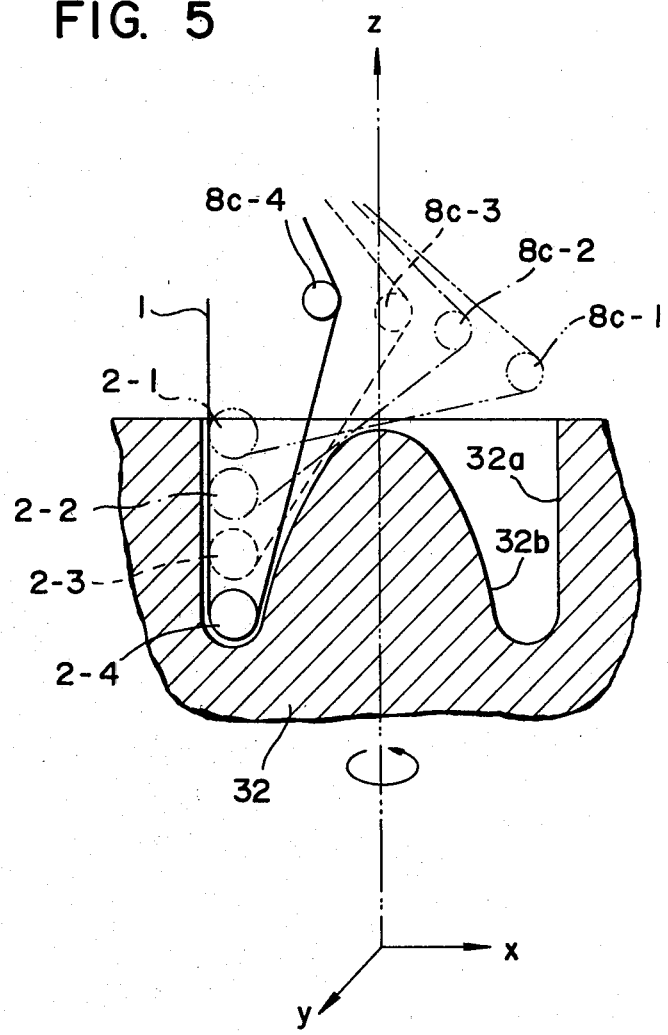

ELECTRICAL MACHINING METHOD AND APPARATUS FOR FORMING A 3D SURFACE CONTOUR IN A WORKPIECE WITH A TRAVELING-WIRE ELECTRODE

CROSS-REFERENCE TO A COPENDING APPLICATION

This application is a cont.-in-part of Ser. No. 081,352 filed Oct. 3, 1979 now U.S. Pat. No. 4,301,349 issued Nov. 17, 1981.

FIELD OF THE INVENTION

The present invention relates generally to electrical machining techniques, viz. electrical discharge machining (EDM), electrochemical machining (ECM) and electrochemical-discharge machining (ECDM) and, more particularly, to an electrical machining method and apparatus for forming a three-dimensional (3D) surface contour in a workpiece or for forming a contour of 3D configuration on a workpiece surface with a traveling-wire electrode.

BACKGROUND OF THE INVENTION

In the copending application referred to above it has been pointed out that the then-available electrical machining techniques, when applied to the forming of a 3D contour or surface pattern in a workpiece, commonly required a tool electrode three-dimensionally shaped to conform to the desired contour or surface pattern. Furthermore, a multiplicity of such solid electrodes of identical or similar configuration and size had to be prepared in order to compensate for the wear which the electrodes or tools suffered during the erosion process or in the interest of minimizing the machining time to obtain a desired machined precision and surface finish. Preparation of such precision-formed and multiple electrodes is obviously time-consuming and laborious.

In the copending application referred to above there is thus disclosed an electrical machining apparatus of a milling, sculpturing or shaving type for forming a 3D surface contour in a workpiece. The there disclosed apparatus comprises a wire or like continuous elongate electrode (hereinafter referred to as "wire" or "wire electrode"), a wire-advancing means for axially transporting the wire from a supply means to a takeup means, a workpiece support for carrying the workpiece, wire-guide means carried by a tool head and juxtaposed with the workpiece for positioning the wire transported under tension in a machining relationship with the workpiece, power supply means for electrically energizing the wire and the workpiece to electroerosively remove material from the latter across a fluid filled machining gap and machining feed means for relatively displacing the tool head and the workpiece support so as to cause the wire advanced over the guide means to sweep over a predetermined surface region on the workpiece along a predetermined machining path to form the 3D surface contour therein, the guide having an electrically nonconductive grooved wire-guiding surface for receiving the advancing wire so that it is substantially exposed to the juxtaposed workpiece surface.

The guide means may comprise one or more (e.g. a plurality of) guide members of rotary or non-rotary type whose wire guiding configuration may be adjustable to variably adjust the length, width and area of the wire running juxtaposed in a machining relationship with the workpiece surface.

The machining feed means may comprise first drive means for displacing the tool head toward and away from the workpiece along a Z-axis, second drive means for displacing the workpiece support in a plane along an X-axis and Y-axis which are orthogonal to each other and to the Z-axis. Preferably the feed means also includes third drive means comprising rotary means for rotating the tool head about the Z-axis so that the direction of traverse advance of the wire may always lie perpendicular to or, generally, a predetermined angle to, the surface being machined in the workpiece. In a typical shaving operation, the second and third drive means are used while milling and sculpturing operations generally require all of the first, second and third drive means to be operated in conjunction with one another. A conventional numerical controller may be used to operate the drive to cause the tool head to sweep over the workpiece surface under instructions of a program stored and preset to correspond to a desired sweeping path.

Additionally, fourth drive means may be incorporated to allow a tilt of the tool head with a variable angle relative to the workpiece so that the tool head and the workpiece are relatively displaced with five degrees of freedom.

It has also been pointed out that means is preferably provided additionally for imparting a high-frequency vibration in a sonic or ultrasonic range directly or indirectly, e.g. through a machining medium, to the wire advanced through the guide means in juxtaposition with the workpiece. The vibration may be provided by means of an electromechanical transducer or magnetostrictive element but, advantageously, may be induced in response to machining electrical pulses applied across the machining gap between the wire and the workpiece. Specifically, a resonant circuit is connected to the machining gap, whose resonant frequency is in tune with the frequency of the electrical oscillation generated at the machining gap.

OBJECTS OF THE INVENTION

It is a principal object of the present invention to provide an improved electrical machining method and apparatus of milling, sculpturing or shaving type whereby a 3D contour or any desired intricate pattern is readily formed in a workpiece with a wire or the like continuous elongate electrode.

Another object of the invention is to provide a milling, sculpturing or shaping-type electrical machining method and apparatus which allow formation of a desired 3D or intricate contour or surface pattern in a workpiece with an increased efficiency.

SUMMARY OF THE INVENTION

In accordance with the present invention there is provided, in a first aspect thereof, a method of electroerosively forming a 3D contour in a workpiece with a continuous elongate electrode axially transported continuously from a supply means to a takeup means to continuously renew a machining surface of the electrode juxtaposed in an electroerosion machining relationship with the workpiece, the method comprising the steps of: supporting the continuous elongate electrode traveling between the supply and takeup means with guide means carried by a tool head and having an arcuate linear guide surface juxtaposed with the workpiece to guide the traveling elongated electrode over at least a portion of the arcuate guide surface thereby constituting the said machining surface at least in part with at least a portion of the said elongate electrode traveling over the guide surface; passing an electroerosive machining current between the elongate electrode and the workpiece across a fluid filled machining gap to remove material from a portion of the workpiece juxtaposed with the machining surface of the elongate electrode; and translationally displacing the tool head relative to the workpiece so that the said portion of the elongate electrode moves along a predetermined contouring path in the workpiece while rotating the said guide means relative to the workpiece about a rotary axis intersecting the said machining surface or the axis thereof in a plane defined by the elongate electrode traveling and guided over the said guide surface, thereby forming the said contour in the workpiece.

The guide means may be secured to the tool head or alternatively may be carried rotatably about the above-mentioned axis on the tool head. When the guide means is secured to the tool head, the latter is rotated relative to its carriage, e.g. an arm carried by a ram of the machine proper. The supply and takeup means for the traveling elongate electrode are both conveniently carried on the tool head.

Specifically, the contouring path may be a curved line along the path of which a groove of a width and/or depth corresponding to the thickness of the elongate electrode is to be formed in a workpiece. Then, the guide means is rotated so as to maintain the said plane of the elongate electrode always oriented in the advance direction of the said translational displacement between the tool head and the workpiece along the said curved line.

The translational displacement between the tool head and the workpiece may be in the direction of depth of the workpiece and the latter may be rotated about the said rotary axis relative to the tool head.

The said guide means is rotated on the tool head about the said rotary axis which is substantially perpendicular to the surface of the workpiece.

In accordance with a further feature in the first aspect of the invention, the continuous elongate electrode is supported between the supply and takeup means with the said guide means as a primary guide element and further with a subsidiary guide element carried on the tool head, the method further including the step of changing the relative positions of the subsidiary guide element and the primary guide element during a course of forming the contour. Specifically, the relative positions of the subsidiary guide element and the primary guide element are changed to substantially change the angle of inclination of the machining surface with the surface of the workpiece or to change the effective area of the said machining surface relative to the surface of the workpiece.

Here again the contouring path may be a curved line along the path of which a groove of a width and/or depth corresponding to the thickness of the elongate electrode is to be formed in a workpiece. Then, the tool head is rotated about the said rotary axis so as to keep the plane defined by the elongate electrode guided by the primary and secondary guide elements always oriented in the advance direction of the said translational displacement between the tool head and the workpiece along the said curved line.

The translational displacement between the tool head and the workpiece may also be in the direction of the depth of the workpiece. The latter is then rotated about the said rotary axis relative to the tool head.

The primary guide element may be secured on the tool head and the latter is then rotated about the said rotary axis which is substantially perpendicular to the surface of the workpiece.

The invention provides, in a second aspect thereof, an apparatus for electroerosively forming a 3D contour in a workpiece with a continuous elongate electrode axially transported continuously from a supply means to a takeup means to continuously renew a machining surface of the electrode juxtaposed in an electroerosive machining relationship with the workpiece, the apparatus comprising: guide means carried by a tool head and an arcuate linear guide surface to constitute the said machining surface of the elongated electrode at least in part with at least a portion of the elongate electrode traveling over the said guide surface; power supply means for passing an electroerosive machining current between the elongate electrode and the workpiece across a fluid filled machining gap to remove material from a portion of the workpiece juxtaposed with the said machining surface of the elongate electrode; first drive means for translationally displacing the tool head relative to the workpiece so that the said portion of the elongate electrode moves along a predetermined contouring path in the workpiece; and second drive means for rotating the said guide means relative to the workpiece about a rotary axis intersecting the machining surface in a plane defined by the elongate electrode traveling over the said guide surface.

Specifically, the guide means may be secured to the tool head and the latter is then arranged to be rotatable about the said rotary axis by the first drive means. However, this is not essential and the guide means may then be arranged to be rotatable relative to the tool head about the said rotary axis. The supply and takeup means are also both conveniently carried on the tool head. This, too, is not essential, however. The supply and takeup means may be monted on a column of the machine from which an arm extends to carry the tool head above the workpiece.

In accordance with a further feature in the second aspect of the invention, the apparatus further includes a subsidiary guide element cooperating with the aforesaid guide means as a primary guide element for supporting the continuous elongate electrode between the supply and takeup means, and means for changing the relative positions of the subsidiary guide element and the primary guide element during the course of forming the contour.

BRIEF DESCRIPTION OF THE DRAWING

These and other objects, features and advantages of the present invention will become more readily apparent from the following description, reference being made to the accompanying drawing in which:

FIGS. 3 and 4 are sectional views of a portion of guide means of the apparatus of FIG. 1 for explanation of the principles of the primary and subsidiary guide elements according to the invention as aplied to a certain exemplary form of 3D contour-forming;

FIG. 5 is a sectional view of the said portion of the guide means for explanation of the principles of the invention as applied to another form of 3D contour-forming;

FIG. 6 is a plan view of exemplary contouring parts to be followed by the tool head and the workpiece in their relative displacement according to a method of the invention;

SPECIFIC DESCRIPTION

Figure 1:
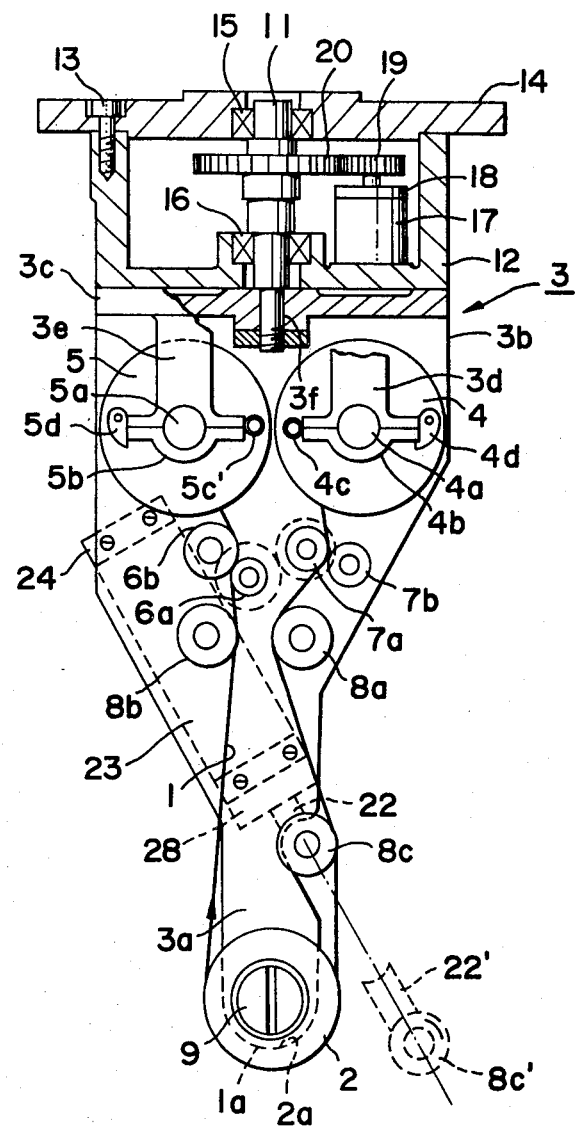
FIG. 1 is a front view partly in section diagrammatically illustrating an apparatus embodying the present invention.

The apparatus of FIGS. 1 and 2 of the present invention makes use of a wire or the like elongate continuous electrode 1 (hereinafter referred to as a "wire" or "wire electrode") composed of copper, brass or like material utilized in conventional traveling-wire or wire-cutting electrical discharge machines and having a thickness of 0.05 to 1 mm diameter. The wire 1 is supported over a main guide roller or slide 2 of an electrically nonconductive material to form an arcuate stretch 1a arranged at a downwardly projecting end portion 3a of a tool head 3 which carries a wire supply reel 4 and a wire takeup reel 5 as shown and also has drive rollers 6a and 6b (capstan and pinch rollers) and brake rollers 7a and 7b mounted thereon together with auxiliary guide rollers 8a, 8b and 8c. The drive and brake rollers 6a, 6b and 7a, 7b are driven to cause the wire 1 to be unwound from the supply reel 4 and wound onto the takeup reels 5 and, in the path therebetween including a U-shaped path over the machining guide roller 2, to continuously travel at a predetermined rate under a suitable tension. Although not shown, the roller or slide 2 constituting wire guide means for machining purposes may be formed with a wire reception groove on the periphery thereof of such a depth and width that a substantial portion of the wire 1 may be exposed. When the guide member 2 is a slide that roller 2 rotatably supported on a shaft 9 to the end 3a of the tool head 3, it is rotated as the wire 1 is driven carried in the groove. When the guide member 2 is a slide that slide 2 is fixedly mounted to the end 3a of the tool head 3 by means of a bolt 9a and a nut 9b (FIG. 2), and the wire 1 slidably passes in the groove over the slide 2.

The tool head 3 comprises a main frame 3b having the end projection 3a and an attachment flange 3c secured to the main flame 3b. A pair of brackets 3d and 3e suspend from the flange 3c to carry rotary shafts 4a and 5a for the wire supply and takeup reels 4 and 5, respectively. The shafts 4a and 5a supporting the reels 4 and 5 are journaled in split bearings 4b and 5b mounted to the lower ends of brackets 3d and 3e by means of hinges 4c and 5c, respectively. The shafts 4a and 5a are driven with suitable torque by a motor 10a (FIG. 2) attached on the rear face of the main frame 3b to drive the reels 4 and 5 to cause them to perform the takeup and supply functions and the wire 1 to travel smoothly via brake rollers 7a, 7b, auxiliary guide roller 8a, auxiliary guide roller 8c, main guide roller or slide 2, auxiliary guide roller 8b, and capstan and pinch rollers 6a and 6b. The reels 4 and 5 are also shown provided with levers 4d and 5d which can be locked to hold these reels against rotation when the machine is not in operation. Referring to FIG. 2, other drive units 10b and 10c are also shown which give a suitable torque to brake rollers 7a and 7b and drive the capstan 6a, respectively.

In accordance with an important feature of the invention, the main guide element 2 supporting the wire 1 along its guide surface 2a to place the wire stretch 1a traveling thereon in a machining relationship with a workpiece (not shown in FIGS. 1 and 2) is arranged to be rotatable about a vertical axis intersecting the center of the arcuate guide surface 2a so that the wire stretch 1a may change the direction of its advance relative to the workpiece during a given course of machining operations. This can be achieved, in the arrangement shown, by arranging the tool head 3 to be rotatable about such an axis or an axis in parallel therewith.

Accordingly, the flange 3c of the tool head 3 is formed with a central bore 3f in which a rotary shaft 11 is fixedly received and may be threaded into the main frame 3b. The rotary shaft 11 thus secured to the tool head 3 extends through a casing 12 which is mounted in sliding contact above the flange 3c as shown or out of contact with the latter and which is secured by means of bolts 13 to a plate 14 which is in turn secured to an arm of the machine proper (not shown). The shaft 11 is journaled between the plate 14 and the casing 12 by bearings 15 and 16 to rotatably support the tool head 3. A stepping motor 17 equipped with an encoder 18 is seated within the casing 12 and driven to rotate the shaft 11 via spur gears 19 and 20. Thus, the tool head 3 or the main frame 3b, supporting at its lower end 3a the main guide element 2 is rotated about the shaft 11.

In the arrangement shown, the wire guide system including the auxiliary guide rollers 8a, 8b and 8c is arranged to hold the wire 1 traveling in a fixed plane relative to the main frame 3b (FIG. 2) and coaxial or in parallel with the rotary shaft 11 of the tool head 3. This arrangement is desirable in the interest of ease of programming of rotary commands for the tool head 3 in accordance with a desired pattern of machining on a workpiece by the electrode wire stretch 1a guided along the U-shaped machining guide surface 2a.

In accordance with an important feature of the invention, the auxiliary element 8c (this element hereinafter being referred to as a "subsidiary guide roller" or "subsidiary guide element") directly adjacent to the main guide element 2 is arranged so as to be displaceable relative to the latter during a given course of machining operations when a substantial length of the stretch of the wire 1 guided therebetween is to serve as the machining electrode surface so that the effective machining area may be varied according to, or held constant in spite of, a particular pattern being machined on the workpiece.

In order to allow the in-process change in the position of the subsidiary guide roller 8c relative to the main guide element 2, the roller 8c is connected via a connecting rod 21 to a piston rod 22 of a hydraulic or oil-pressure cylinder 23 (FIG. 2) attached to the rear surface of the main frame 3b of the tool head 3 by means of screws 24. Operating fluid for the cylinder 23 is supplied via a four-way valve 25 from a pump 26 and is collected into a vessel 27. The cylinder 23 is equipped with an encoder 28.

The four-way valve 25 is operated under instructions preprogrammed in a machining control unit (not shown) to actuate the cylinder 23 to advance and retract the piston rod 22 and to displace the subsidiary guide roller 8c carried thereby between the positions shown by solid and broken lines, respectively, in FIG. 1. A displacement of the subsidiary guide 8c is detected by the encoder 28 and thereby converted into an electric signal which is fed back to the machining control unit.

The tool head 3 as described before is rotatably attached to the arm of the machine which includes a power supply (not shown) connected to the wire electrode 1, say, via the auxiliary guide roller 8a on one hand and to the workpiece on the other, and a fluid supply unit (not shown) for supplying a machining medium, e.g. dielectric or electrically conductive water, to the region of the main guide 2. A high-density electroerosive current is thus passed between the wire stretch 1a and the workpiece across the fluid filled machining gap to remove material from the workpiece. The stepping motor 17 (FIG. 1) and the four-way valve 25 (FIG. 2) are controlledly operated by electrical commands furnished from a numerical controller (NC) in the machining control unit. The machining feed system further includes a workpiece carriage for supporting the workpiece and stepping motors for incrementally displacing the workpiece carriage in an X-Y or horizontal plane and a tool carriage for supporting the arm of the machine and a stepping motor for incrementally displacing the tool head 3 vertically or along a Z-axis.

A desirability for the wire stretch 1a guided over the main guide 2 to have an increased effective machining area in the course of a given machining operation arises in various situations. Assume, for example, that the tool head 3 is oriented in the direction of the X-axis and is to be advanced in the same direction to form a shallow groove of a narrow width corresponding to the thickness of the wire on the surface of a workpiece. In FIG. 3, such a groove is denoted at 30a and shown to be formed on a workpiece 30. Then, when the main guide 2 is the sole element to guide the wire 1 to form a machining stretch 11a juxtaposed with the workpiece 30, it is seen that the portion of wire stretch 1a located substantially below the surface 31 corresponding to the center angle a is capable of providing the effective machining area which may be too small to carry the machining current, or which may otherwise limit the effective machining current and hence require an excessively long machining time.

In this situation, the subsidiary guide roller 8c may, in accordance with the principles of the invention, be displaced to stretch the wire 1 in the direction of its advance or along the X-axis so that the wire stretch 1a is juxtaposed over its extended length l with the workpiece 30 with a small angle $\beta$ of inclination relative to the workpiece surface 31. An increased machining area then results and avoids a concentration of electrical discharges while effectively increasing the mean machining current, thereby reducing the machining time. The length l of that increased stretch can be controlled by the position of the displaced subsidiary guide roller 8c. In this case, assuming that the increment of the stepped machining displacement in the direction of X-axis is dx, the reduction in the machining gap length is expressed by $\sin \beta \cdot dx$. Since $\sin \beta < 1$ and $\beta$ is small, only a small change is then encountered in the size of the machining gap, permitting an increased machining stability to ensue. In this manner, the position of the subsidiary guide element 8c is controlled during the maching operation according to an instantaneous change in the depth of cut or in the cutting, forming or profiling pattern.

A pattern, for example, of a cut defined by a combination of a cylinder 32a and a spindle-shaped projection 32b as shown in FIG. 5 can be machined readily and efficiently as well in a workpiece 32 with the arrangement in which the subsidiary guide element 8c is capable of displacement relative to the main guide element 2 during the course of machining operation. In this case, the workpiece 32 may be rotated about the axis of symmetry of the pattern or Z-axis shown while the main guide 2 is displaced to take positions 2-1, 2-2, 2-3 and 2-4 succesively along the Z-axis. The subsidiary guide 8c may then be displaced successively in the X-Z plane to take position 8c1, 8c-2, 8c-3 and 8c-4 as shown with the progress of material removal from the workpiece. A minimum machining area of the wire stretch 1a is thus maintained to permit achievement of the desired machining with an increased efficiency and a satisfactory machined surface quality.

The particular construction of the tool head 3, especially the configuration and arrangement of the individual guides shown, the supporting structure and positioning manner of the subsidiary guide element as well as manner of displacement thereof can be modified obviously within the ordinary skill of the art. Furthermore, the wire supply and takeup reels, brake rollers and/or capstan and pinch rollers may be installed separately from the tool head 3, for example, on a column of the machine which supports the arm which extends over the workpiece to carry the tool head there. The tool head 3 may then only carry the main guide element 2 as well as the subsidiary guide or guides 8c together with or without auxiliary guide rollers 8a and 8b to receive the wire electrode 1 supplied from the region of the column and to return it to the latter for collection.

It is desirable, as mentioned previously, to arrange the main guide 2 or the tool head 3 to be rotatable during a given course of machining operation about the vertical axis intersecting the lowermost position or turning point of the wire 1 or wire stretch 1a guided by the main guide 2 so that the plane of the turning (U-shaped) wire 1 is made coincident with the direction of its relative advance or advance of the tool head 3 relative to the workpiece. In this manner, the utility of the apparatus is markedly extended.

Figure 7:
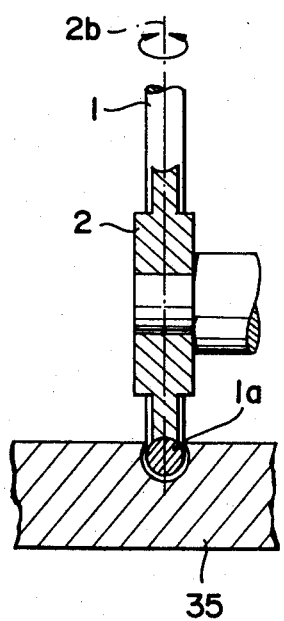
FIG. 7 is a sectional view diagrammatically illustrating a wire electrode traveling over the guide element to conduct the contour-forming operation along a path shown in FIG. 6.

For example, assume that as shown in FIGS. 6 and 7, shallow and curved grooves 35a of a narrow width corresponding to the thickness of the wire electrode 1 are to be machined in a workpiece 35 by displacing the wire electrode 1 along the path 35b relative to the workpiece 35. Then the workpiece 35 may be securely mounted on a rotary table which is in turn displaceably mounted on an X-Y cross-table, the two tables thus providing a three-axis positioning control. This, however, not only makes the movement of the workpiece extremely complex but allows only a comparatively small workpiece to be handled and machined for the size of the machine and the cross-table. In addition, a highly complicated and redundant or lengthy programming is required.

Assume then that the tool head 3 is fixed so that the main plane of the main guide 2 or the plane of the wire 1 guided thereby lies in an X-Z plane including the X-axis and the X-Y plane orthogonal thereto and the turning point or the lowermost position of the wire electrode lies at the origin O, and that machining proceeds along the curve ABC shown. Then, when the region of point B is machined, it is necessary to simultaneously finish the rotary movement of the workpiece 35 with the rotary table when the tangent $T_B$ at the point B becomes parallel with the X-axis and the translatory movement of the workpiece 35 when the point becomes coincident with the origin O. It is apparent that the combined movement is highly complex and cannot immediately or intuitively be grasped. Further, the rotation of the workpiece 35 might occur about a point remote from the origin O and then it is necessary with the cross-table to keep above the worktable a space considerably larger than the space usually required to permit the operation of the X-Y cross-table. Moreover, moving the workpiece along a prolonged and complicated path requires an extremely complex and lengthy programming for positioning the workpiece relative to the fixed tool head.

In accordance with the principles of the invention, only a translatory movement in the X-Y plane is applied to the workpiece 35 so that the point B on the machining curve ABC may always coincide with the turning point of the wire or with the origin O while the tool head 3 is simply rotated to rotate the main plane of the main guide 2 or the plane of the wire stretch 1a about the vertical axis including the turning point or about a Z-axis so that the tangent $T_B$ may always, lie in the main plane of the main guide 2 or the plane of the wire stretch 1a. In this manner, the machining process becomes immediately and more intuitively apparent. The rotary control of the main guide is extremely simple and the NC programming required to this end is practically susceptible of no error. Further, the number of programming steps is markedly reduced and, because the path of movement of the workpiece is reduced, the programming is eventually simplified. Still further, only a space just required for the operation of the X-Y cross table is sufficient and provided above the worktable, permitting a comparatively large workpiece to be handled and machined with ease.

Figure 2:
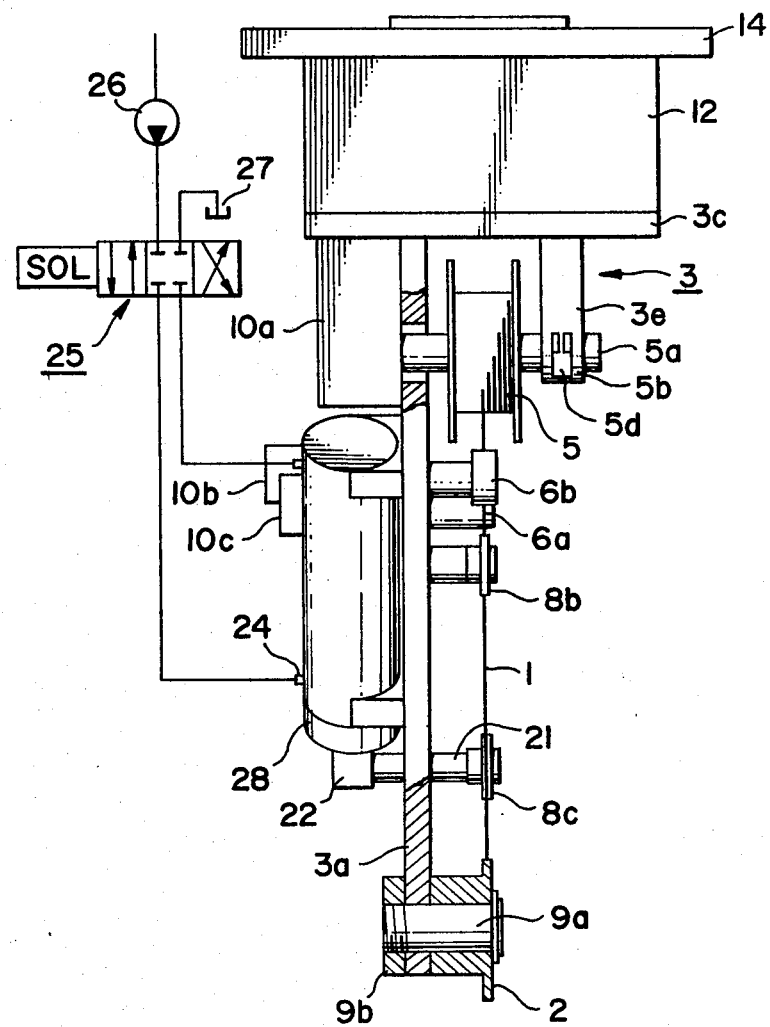
FIG. 2 is a side view partly in section and partly in schematic form of the apparatus of FIG. 1.

In the structure illustrated in FIGS. 1 and 2 as an embodiment of the invention, the rotation of the main guide 2 is achieved through the rotation of the rotary shaft 11 so that the tool head 3 carrying all elements in the path of wire 1 from the supply reel 4 to the takeup reel 5 is rotated as a unitary body about the axis. It will be appreciated that the structure may be modified so as to allow only a portion of the tool head which carries the main guide 2 to be rotated in accordance with the principles of the invention.

It will also be appreciated that an increased cutting performance is obtainable with the arrangement already described in which the subsidiary guide element 8c directly adjacent to the main guide element 2 is arranged to be controlledly displaceable to vary its wire guide position. In FIG. 6, assume that the relatively straight region of the point A is being machined. The cylinder 23 is then operated by the valve unit 25 to extend the piston rod 22 thereby increasing the angle of inclination of the wire stretch 1a between the main and subsidiary guides 2 and 8c with the Z-axis. As explained hereinbefore, an increase in the machining area is then achieved which permits a greater mean machining current to be passed between the wire stretch 1a and the workpiece.

Figure 9:
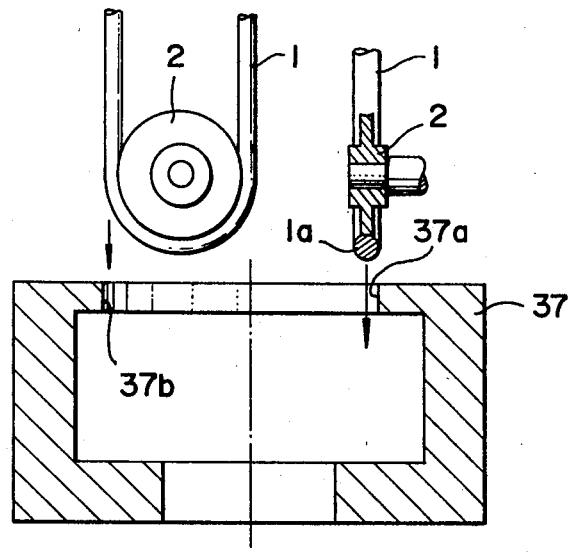
FIGS. 8 and 9 are sectional views diagrammatically illustrating other 3D contour-forming examples which can be performed by the method and apparatus of the invention.
Figure 8:
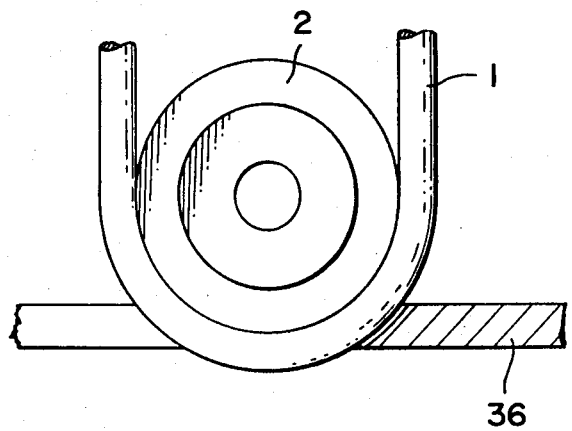

The present arrangement is also useful for the process of cutting a thin workpiece 36 as shown in FIG. 8 and for the process of cutting an inner rim 37a or cutting there a thread 37b in a workpiece 37 as shown in FIG. 9. Such an intricate profile can be formed with relatively simple programming.

The present invention is broadly applicable to exploitation of electroerosion machining principles. The terms "electroerosion" machining and "electrical machining" are, as noted previously, to be understood to include electrical discharge machining (EDM), electrochemical machining (ECM) and electrochemical-discharge machining (ECDM). The principles of these machining processes are well known and no detailed elaboration is required herein. In EDM a succession of electrical pulses are applied from a specially designed generator between the tool electrode, e.g. a wire electrode, and the workpiece across a machining gap flooded with a liquid dielectric, e.g. distilled water. In ECM and ECDM a high-amperage electric current is applied in the form of an unidirectional current or a succession of pulses poled to make the tool electrode cathodic and the workpiece anodic across a machining gap flooded with an electrolyte to remove material from the workpiece by the electrolytic action or a combination of electrolytic and spark-discharge actions.

There is thus provided an improved method as well as apparatus for electroerosively forming a 3D or intricate contour in a workpiece to effectively overcome the problems encountered in the art.

What is claimed is:

1. A method of electroerosively forming a contour in a workpiece with a continuous wire electrode, the method comprising the steps of:
   axially transporting said continuous wire electrode continuously from a supply means to a takeup means along a continuous path of travel to continuously renew a machining surface of the electrode;
   supporting the continuous wire electrode traveling between said supply and takeup means with guide means carried by a tool head and having an arcuate linear machining guide surface in said continuous path of travel to guide the traveling wire electrode over at least a portion of said arcuate machining guide surface;
   positioning said guide means on said tool head so as to juxtapose said machining guide surface with said workpiece and so as to bring at least a portion of said wire electrode over said machining guide surface into an electroerosive machining relationship with said workpiece so that said portion of the continuously traveling wire electrode provides at least a portion of said continuously renewed machining surface;
   passing an electroerosive machining current between said wire electrode and said workpiece across a fluid filled machining gap to remove material from a portion of the workpiece juxtaposed with said machining surface of the wire electrode; and
   relatively displacing said tool head and said workpiece in translation so that said machining guide surface effectively moves along a predetermined contouring path in said workpiece, while rotating said guide means relative to said workpiece about a rotary axis which intersects said arcuate linear machining guide surface and said portion of the wire electrode thereon, thereby forming said contour in said workpiece.

2. The method defined in claim 1 wherein said guide means is secured to said tool head and is rotated by rotating said tool head about said rotary axis.

3. The method defined in claim 2 wherein at least one of said supply means and said takeup means is carried on said tool head.

4. The method defined in claim 1 wherein said contouring path is a curved line and said guide means is rotated so as to maintain the plane defined by said wire electrode traveling and guided over said arcuate linear machining guide surface to lie in the advance direction of said translational displacement between said tool head and said workpiece along said curved line.

5. The method defined in claim 1 wherein said translational displacement between said tool head and said workpiece includes a displacement in the direction of depth of said workpiece, and said workpiece is rotated about a rotary axis relative to said tool head generally independently of said rotation of the guide means.

6. The method defined in claim 1 wherein said guide means is (rotatably carried) on said tool head and is rotated about said rotary axis which is substantially perpendicular to the surface of said workpiece.

7. The method defined in claim 1 wherein said wire electrode is supported between said supply and takeup means with said guide means as a primary guide element and further with a subsidiary guide element carried on said tool head, said method further comprising the step of changing the relative positions of said subsidiary guide element and said primary guide element during a course of forming said contour.

8. The method defined in claim 7 wherein said relative positions of said subsidiary and primary guide elements are changed to substantially change the angle of inclination of said machining surface with the surface of the workpiece.

9. The method defined in claim 7 wherein said relative positions of said subsidiary and primary guide elements are changed to change the effective area of said machining surface.

10. The method defined in claim 7 wherein said contouring path is a curved line and said tool head is rotated about said axis so as to keep the plane defined by the wire electrode guided by said primary and secondary guide elements always oriented in the direction of said translational displacement between said tool head and the workpiece along said curved line.

11. The method defined in claim 7 wherein said translational displacement between said tool head and said workpiece includes a displacement in the direction of depth of said workpiece, and said workpiece is rotated about said rotary axis relative to said tool head generally independently of said rotation of the guide means.

12. The method defined in claim 7 wherein said primary guide element is secured on said tool head and said tool head is rotated about said rotary axis which is substantially perpendicular to the surface of said workpiece.

13. An apparatus for electroerosively forming a contour in a workpiece with a continuous wire electrode axially transported continuously from a supply means to a takeup means along a continuous path of travel to continuously renew a machining surface of the electrode, the apparatus comprising:

guide means carried by a tool head and having an arcuate linear machining guide surface in said continuous path of travel for guiding the traveling continuous wire electrode over at least a portion of said arcuate machining guide surface;

means for positioning said guide means on said tool head so as to juxtapose said arcuate linear machining guide surface into electroerosive machining relationship with said workpiece so that said portion of the continuously traveling wire electrode provides at least a portion of said continuously renewed machining surface;

power supply means for passing an electroerosive machining current between said wire electrode and said workpiece across a fluid filled machining gap to remove material from a portion of the workpiece juxtaposed with said machining surface of the wire electrode;

first drive means for relatively displacing said tool head and said workpiece in translation so that said machining guide surface effectively moves along a predetermined contouring path in said workpiece; and second drive means for rotating said guide means relative to said workpiece about a rotary axis which intersects said arcuate linear machining guide surface and said portion of the wire electrode traveling over said surface.

14. The apparatus defined in claim 13 wherein said guide means is secured to said tool head and the latter is arranged to be rotatable about said rotary axis by said second drive means.

15. The apparatus defined in claim 13 wherein said supply means and said takeup means are carried on said tool head.

16. The apparatus defined in claim 13, further comprising a subsidiary guide element cooperating with said guide means as a primary guide element for supporting said continuous wire electrode between said supply and takeup means, and means for changing the relative positions of said subsidiary guide element and said primary guide element during a course of forming said contour.

* * * * *